(12) United States Patent
Kunimitsu et al.

(10) Patent No.: US 9,696,714 B2
(45) Date of Patent: Jul. 4, 2017

(54) NUMERICAL CONTROLLER FOR CONTROLLING A TOOL AND DISTINGUISHED WORKPIECE AND JIG

(71) Applicant: OKUMA Corporation, Niwa-gun, Aichi (JP)

(72) Inventors: Katsunori Kunimitsu, Niwa-gun (JP); Masayuki Sugie, Aichi (JP)

(73) Assignee: OKUMA CORPORATION (JP)

( * ) Notice: Subject to any disclaimer, the term of this patent is extended or adjusted under 35 U.S.C. 154(b) by 532 days.

(21) Appl. No.: 14/253,460

(22) Filed: Apr. 15, 2014

(65) Prior Publication Data
US 2014/0309766 A1    Oct. 16, 2014

(30) Foreign Application Priority Data

Apr. 15, 2013    (JP) ................. 2013-085041

(51) Int. Cl.
*G06F 19/00*    (2011.01)
*G05B 19/4097*  (2006.01)
(Continued)

(52) U.S. Cl.
CPC ......... *G05B 19/4097* (2013.01); *G05B 19/19* (2013.01); *G05B 19/401* (2013.01);
(Continued)

(58) Field of Classification Search
None
See application file for complete search history.

(56) References Cited

U.S. PATENT DOCUMENTS

2003/0033041 A1* 2/2003 Richey ............... G05B 19/4097
                                                              700/98
2003/0114945 A1* 6/2003 Hirano ............... G05B 19/4097
                                                              700/97
(Continued)

FOREIGN PATENT DOCUMENTS

CN    1861317 A     11/2006
CN    101027616 A    8/2007
(Continued)

OTHER PUBLICATIONS

Office Action Issued Jul. 26, 2016 for Japanese Patent Application JP 2013-085041. 6 pages.
(Continued)

*Primary Examiner* — Adam Lee
(74) *Attorney, Agent, or Firm* — McCarter & English, LLP

(57) ABSTRACT

A numeric controller is provided with a three-dimensional model storage which stores a three-dimensional model of at least one of a workpiece and a jig; a three-dimensional measuring unit which integrally measures shapes of the workpiece and the jig fixed to the machine tool; and a shape processor generating an integrally measured model based on the measured data, in which the workpiece and the jig being integrally recognized, measured by the three-dimensional measuring unit, and further generating, regarding at least one of the workpiece and the jig, an individually measured model in which the workpiece or the jig is individually measured based on the generated integrally measured model and the three-dimensional model of the workpiece or the jig.

3 Claims, 6 Drawing Sheets

(51) Int. Cl.
*G05B 19/19* (2006.01)
*G05B 19/401* (2006.01)

(52) U.S. Cl.
CPC .............. *G05B 2219/49007* (2013.01); *G05B 2219/50015* (2013.01)

(56) References Cited

U.S. PATENT DOCUMENTS

| | | | | |
|---|---|---|---|---|
| 2005/0224479 | A1* | 10/2005 | Watanabe | B25J 9/1666 219/125.1 |
| 2006/0090361 | A1* | 5/2006 | Matsuda | G01B 11/24 33/503 |
| 2009/0015668 | A1* | 1/2009 | Tian | G06T 7/0075 348/92 |
| 2009/0070077 | A1* | 3/2009 | Tian | G06T 7/0075 703/1 |
| 2009/0110498 | A1* | 4/2009 | Park | A61B 17/15 408/1 R |
| 2010/0139107 | A1* | 6/2010 | Koinuma | G01B 5/20 33/503 |
| 2011/0040523 | A1* | 2/2011 | Matsushita | G01B 21/045 702/152 |
| 2014/0233839 | A1* | 8/2014 | Morita | G05B 19/4061 382/141 |

FOREIGN PATENT DOCUMENTS

| | | |
|---|---|---|
| CN | 101356417 A | 1/2009 |
| JP | 2005-1022 A | 1/2005 |
| JP | 2012053508 A | 3/2012 |
| JP | 2012053509 A | 3/2012 |
| WO | 2012/093473 A1 | 7/2012 |

OTHER PUBLICATIONS

Chinese Office Action for Chinese Patent Application No. 201410147553.X. Issued Apr. 6, 2017. 9 pages.

* cited by examiner

NUMERICAL CONTROLLER FOR CONTROLLING A TOOL AND DISTINGUISHED WORKPIECE AND JIG

CROSS-REFERENCE TO RELATED APPLICATIONS

This application claims priority under 35 U.S.C. §1.119(a)-(d) to Japanese Patent Application No. 2013-085041, filed Apr. 15, 2013, the content of which is incorporated herein by reference in its entirety as part of the present disclosure.

FIELD OF THE INVENTION

The present invention relates to a numerical controller which controls a relative position between a tool and a workpiece fixed to a machine tool according to numerical control information, by referring to three-dimensional models of the tool, and the workpiece and the jig fixed to the machine tool.

BACKGROUND OF THE INVENTION

In conventional numerical controllers, with three-dimensional models of a workpiece, jig, tool, machine, or the like available as machine data, a relative position between the workpiece and the tool is controlled to control processing of the workpiece by the tool while performing interference checking.

In interference checking, interference between a three-dimensional model of a workpiece and a three-dimensional model of a tool can be recognized as a cut region and ignorable. Further, a three-dimensional model of a workpiece can be deformed by calculating a cut region according to travel of the three-dimensional model of the tool.

Further, in the numerical control machine tools disclosed in JP 2012-53508 A and JP 2012-53509 A, a three-dimensional shape, position, and orientation of a workpiece fixed to a machine tool can be measured in a non-contact manner.

In order to perform interference checking, three-dimensional models of a tool and a workpiece with a jig are necessary. For a workpiece repeatedly processed, in consideration of possible variation of the shape of the workpiece, it is reliable to measure the actual shape of the workpiece fixed to the machine tool to obtain a three-dimensional model of the workpiece. Further, even with no variety in the shape of the workpiece expected, the position of the jig holding the workpiece may be varied each time the workpiece is processed. Thus, it is reliable to measure the actual shape of the jig fixed to the machine tool to obtain a three-dimensional model of the jig.

Therefore, it is conceivable to create three-dimensional models by measuring the shape of a workpiece and a jig by using a three-dimensional measuring device. However, when creating the three-dimensional models by measuring a workpiece and a jig fixed to a machine tool by using a three-dimensional measuring device, the three-dimensional measuring device cannot determine whether the obtained three-dimensional coordinates represent the measured result of the workpiece or the jig. Therefore, it is impossible to distinguishably provide a three-dimensional model of a workpiece and a three-dimensional model of a jig.

When processing a workpiece while performing interference checking, it is necessary, during a cutting process, to sense interference between a jig and a tool, but it is necessary to ignore interference between the workpiece and the tool. Thus, the three-dimensional model of the workpiece and the three-dimensional model of the jig should be distinguishable.

SUMMARY OF THE INVENTION

A numeric controller according to the present invention controls relative movement between a tool and a workpiece with a jig fixed to a machine tool in accordance with numeric control information. The numeric controller includes a three-dimensional model storage which stores a three-dimensional model of at least one of the workpiece and the jig; a three-dimensional measuring unit which integrally measures shapes of the workpiece and the jig fixed to the machine tool; a measured data storage which stores the measured data, in which the workpiece and the jig are integrally recognized, measured by the three-dimensional measuring unit; and a shape processor generating, based on the measured data of the workpiece and the jig stored in the measured data storage, an integrally measured model in which the workpiece and the jig are integrally recognized, and further generating, regarding at least one of the workpiece and the jig, an individually measured model in which the workpiece or the jig is individually distinguished based on the generated integrally measured model and the three-dimensional model of the workpiece or the jig; wherein the relative movement between the tool and the workpiece with the jig is controlled by referring to the individually measured model generated by the shape processor.

In a preferred aspect, the shape processor compares the integrally measured model and the three-dimensional model of one of the workpiece and the jig, and generates a region, in the integrally measured model, not included in the three-dimensional model of one of the workpiece and the jig as an individually measured model of the other. In another preferred aspect, the shape processor compares the integrally measured model and the three-dimensional model of one of the workpiece and the jig, and generates a region, in the integrally measured model, included in the three-dimensional model of one of the workpiece and the jig as an individually measured model of the one.

By providing the three-dimensional model of the workpiece or the jig in advance, it becomes possible to distinguish the workpiece region and the jig region in the result of the three-dimensional measurement of the workpiece and the jig fixed to the machine tool. As a result, an interference sensing function becomes achievable such that in response to a fast feed command, the interference among the three-dimensional models of all of the workpiece, the jig, and the tool are sensed, while in response to a cutting feed command, the interference between the three-dimensional models of the workpiece and the tool is ignored. Further, the distinguishable three-dimensional models of the workpiece and the jig enable shaping simulation for a cutting feed command by calculating passed region of the tool model and deleting the three-dimensional model of the workpiece for the region overlapping the passed region of the tool model.

DETAILED DESCRIPTION OF EMBODIMENTS OF THE INVENTION

Figure 1:
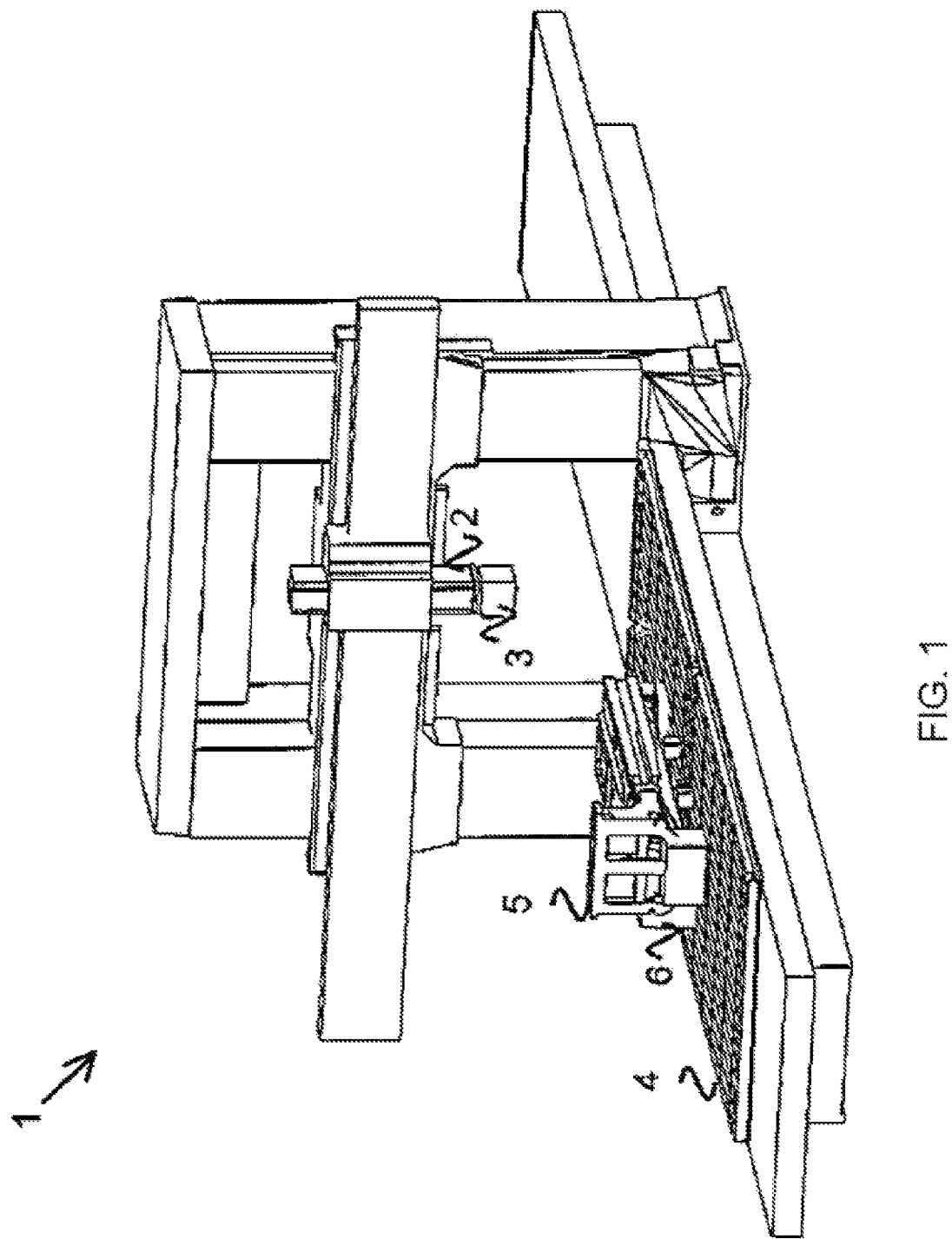
FIG. 1 shows the overall structure of a machine tool.

FIG. 1 shows an example of an overall structure diagram of a machine tool for performing the present invention. In FIG. 1, the entirety of a machine tool 1 is shown with a three-dimensional measuring device 3 mounted on a main shaft 2 of the machine tool 1. Further, a workpiece 5 is placed on a table 4 of the machine tool 1 and fixed with a jig 6.

Figure 2:
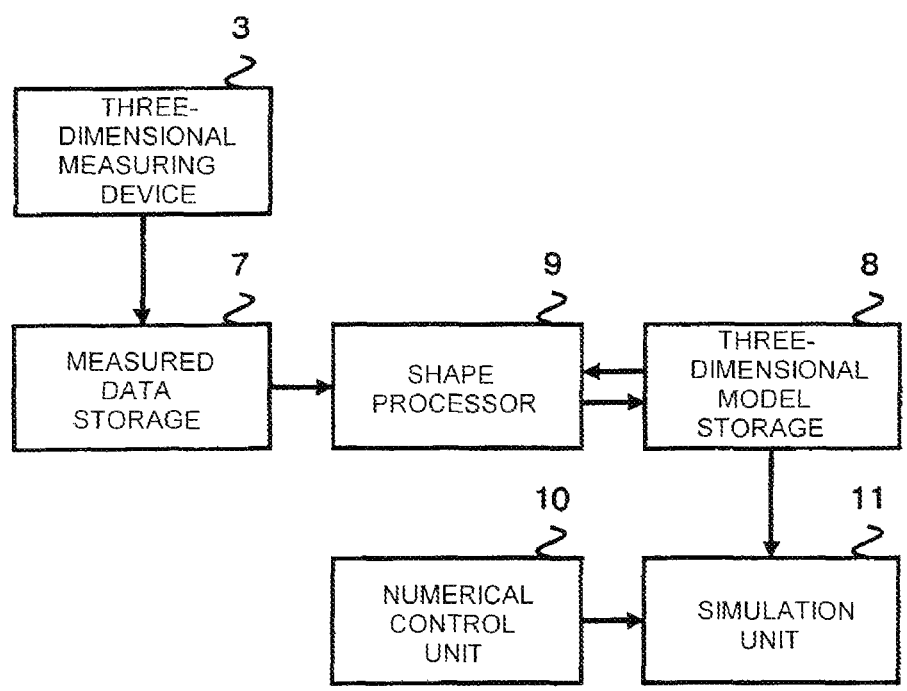
FIG. 2 shows a functional block diagram of a numerical controller.
Figure 3:
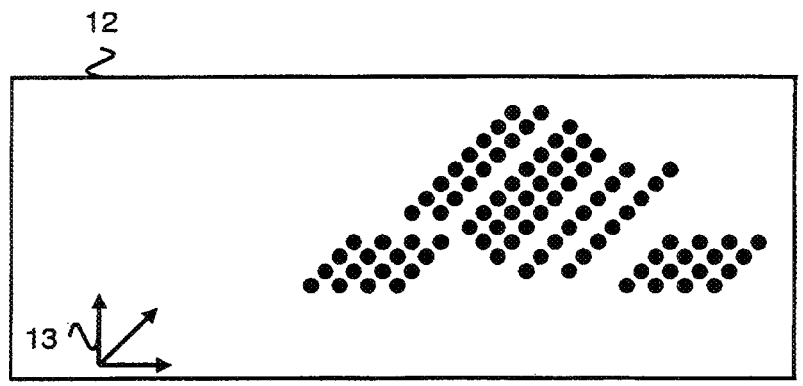
FIG. 3 shows an example of a measured data.

FIG. 2 shows a block diagram of an example to perform the present invention. The three-dimensional measuring device 3 integrally measures the workpiece 5 and the jig 6 fixed to the machine tool 1 and outputs measured data 12 in which the workpiece 5 and the jig 6 are integrally recognized. FIG. 3 schematically shows the measured data 12. A certain point on the table 4 of the machine tool 1 is recognized as a reference point 13 of the machine tool 1 such that the measured data 12 is represented by point cloud data of three-dimensional coordinates (X, Y, Z) with respect to the reference point 13. The outputted measured data 12 is stored in a measured data storage 7.

Figure 4:
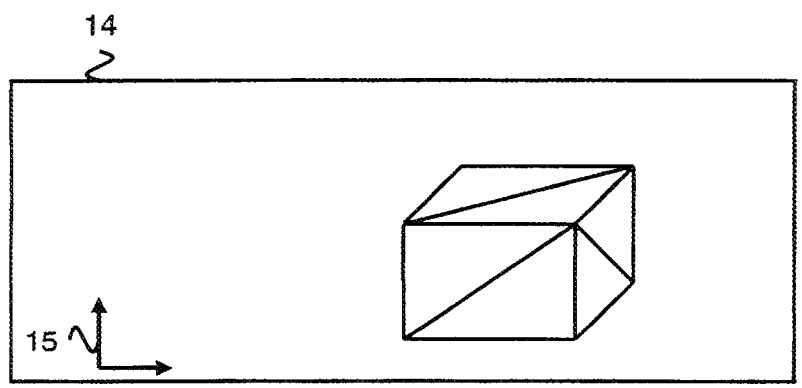
FIG. 4 shows an example of a workpiece model.

A three-dimensional model storage 8 stores a workpiece model 14. FIG. 4 schematically shows the workpiece model 14. The shape of the three-dimensional model is represented with triangle vertex information with respect to a reference point 15. As the workpiece model 14 may be used as a model by a simulation unit 11, it is desirable that the workpiece model 14 has a similar shape to the workpiece 5. However, as the workpiece model 14 is not used in the simulation unit 11 in this embodiment, the workpiece model 14 may have a simple shape, as shown in FIG. 4. In consideration of variation of the shape of the workpiece, the workpiece model 14 is arranged to be larger than the actual workpiece 5 so as to always include the shape of the workpiece. Further, the workpiece model 14 is defined by coordinates which use a point matching the reference point 13 in the measured data 12 as the reference point 15 in consideration of the position of the workpiece 5 placed on the table 4 of the machine tool 1.

Figure 5:
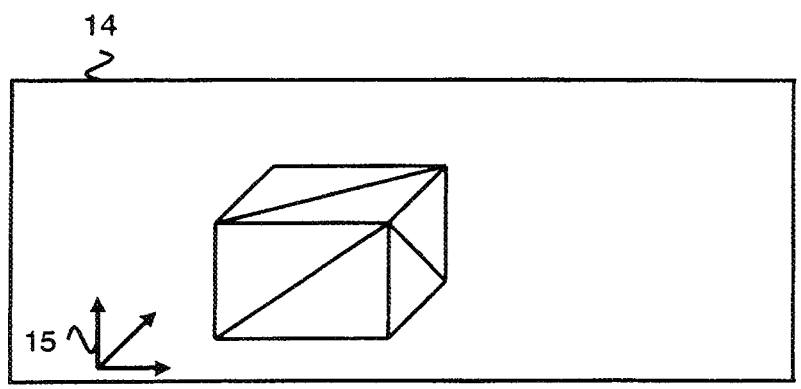
FIG. 5 shows another example of a workpiece model.

FIG. 5 shows a state in which the position of the measured data 12 and the position of the workpiece model 14 do not match each other when the position of the reference point 13 and the position of the reference point 15 are assumed to match each other. The workpiece model 14 may be moved such that the position of the measured data 12 and the position of the workpiece model 14 match each other as shown in FIG. 4 by measuring the position of the workpiece 5 placed on the table 4 of the machine tool 1.

Figure 6:
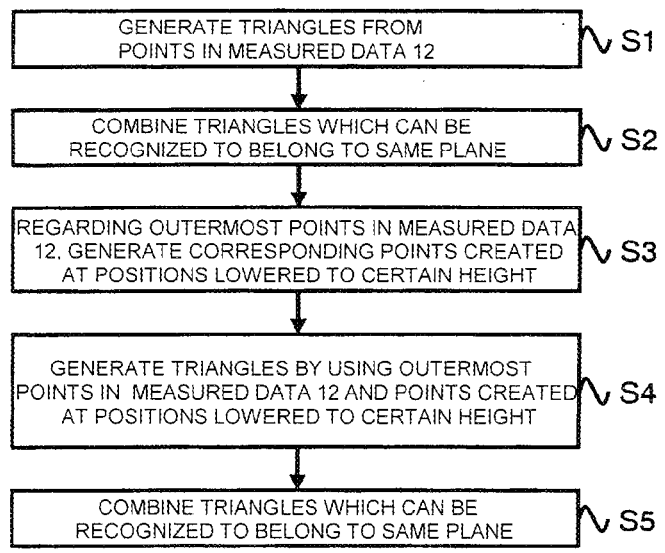
FIG. 6 shows a flowchart showing a flow to create an integrally measured model.
Figure 7:
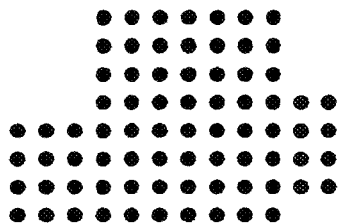
FIG. 7 shows an example of an integrally measured data.

A shape processor 9 generates a measured model 16 in which point cloud data forming the measured data 12 is represented by a set of triangles. FIG. 6 shows a flowchart indicating procedures performed by the shape processor 9 to generate, from the measured data 12, an integrally measured model 16 in which a workpiece and a jig are integrally recognized. FIG. 7 shows a top view of the measured data 12.

Figure 8:
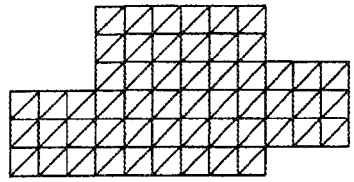
FIG. 8 illustrates a process of generating an integrally measured model.

In order to generate the integrally measured model 16 from the measured data 12, firstly, points in the measured data 12 are connected to create triangles (S1). FIG. 8 shows a state in which the triangles are generated by connecting the points in the measured data 12.

Figure 9:
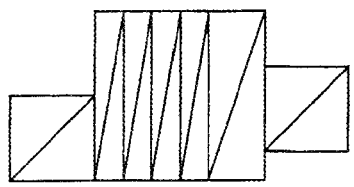
FIG. 9 illustrates a process of generating an integrally measured model.
Figure 10:
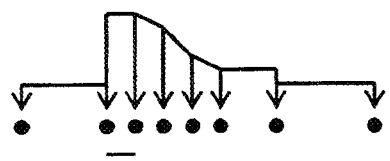
FIG. 10 illustrates a process of generating an integrally measured model.

Next, regarding the generated triangles, if a triangle can be recognized to belong to the same plane as a neighboring triangle (S2), the triangles are combined. FIG. 9 shows a state in which the generated triangles are combined. Then, regarding outermost points in the measured data 12, corresponding points are created at the positions lowered to a certain height (S3). FIG. 10 shows a state in which points are generated.

Figure 11:
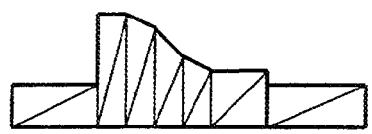
FIG. 11 illustrates a process of generating an integrally measured model.
Figure 12:
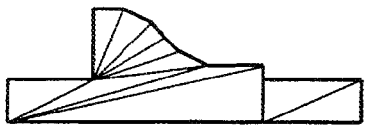
FIG. 12 illustrates a process of generating an integrally measured model.
Figure 13:
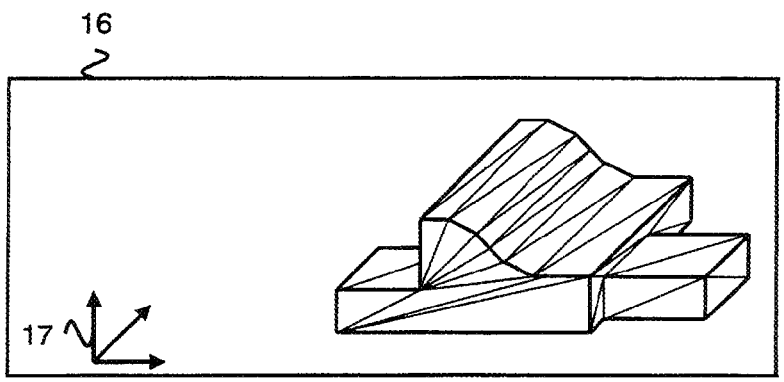
FIG. 13 shows an example of a generated integrally measured model.

Next, triangles are created by using the outermost points in the measured data 12 and the generated points (S4). FIG. 11 shows a state in which the triangles are generated. Then, regarding the generated triangles, if a triangle can be recognized to belong to the same plane as a neighboring triangle, the triangles are combined (S5). FIG. 12 shows a state in which the triangles are combined. FIG. 13 schematically shows the integrally measured model 16 generated in this way. The integrally measured model 16 is represented by vertex information of the triangles with respect to a reference point 17. The reference point 13 of the measured data and the reference point 17 of the integrally measured model 16 represent the same point.

Once the integrally measured model 16 is generated, the shape processor 9 performs a logical operation between the integrally measured model 16 and the workpiece model 14 such that in the integrally measured model 16, the region included inside the workpiece model 14 is set as an individually measured workpiece model 18 which represents the workpiece 5 region individually extracted from the integrally measured model 16. Further, in the integrally measured model 16, the region which is not included in the workpiece model 14 or the individually measured model 18 is set as an individually measured jig model 19 which represents the jig 6 region individually extracted from the integrally measured model 16.

Figure 14:
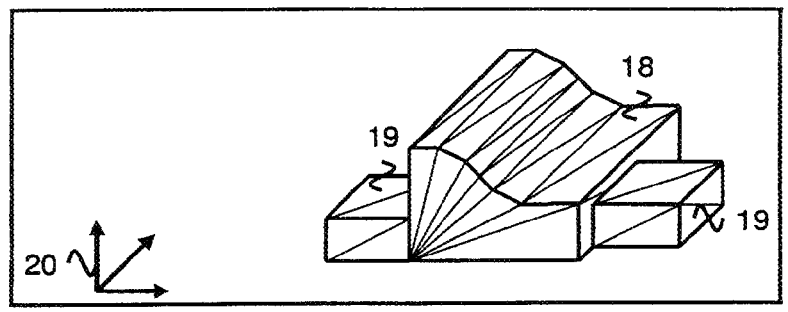
FIG. 14 illustrates an example of an individually measured model of a workpiece and an individually measured model of a jig.

FIG. 14 shows the individually measured workpiece model 18 and the individually measured jig model 19 generated from the integrally measured model. These models are represented by the coordinates of the vertices of the triangles with respect to a reference point 20. The reference point 20 and the reference point 17 of the integrally measured model 16 represents the same point. The shape processor 9 stores the individually measured workpiece model 18 and the individually measured jig model 19 into a three-dimensional model storage 8.

Figure 15:
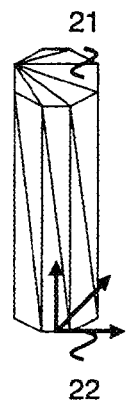
FIG. 15 shows an example of a tool model.

A tool model 21 is also stored in the three-dimensional model storage 8. FIG. 15 shows the tool model 21 which is represented by the coordinates of the vertices of the triangles with respect to a reference point 22. The simulation unit 11 performs interference checking by operating the individually measured workpiece model 18, the individually measured jig model 19, and the tool model 21 based on numerical control information sent from a numerical control unit 10.

In the above description, the workpiece model 14 is assumed to be stored in the three-dimensional model storage. However, when the variation of the installation position of the jig is minimum or the installation position of the jig is known, the jig model may be stored instead such that the region included in the jig model is set as the individually measured jig model, while the region not included in the jig model is set as the individually measured workpiece model.

Figure 16:
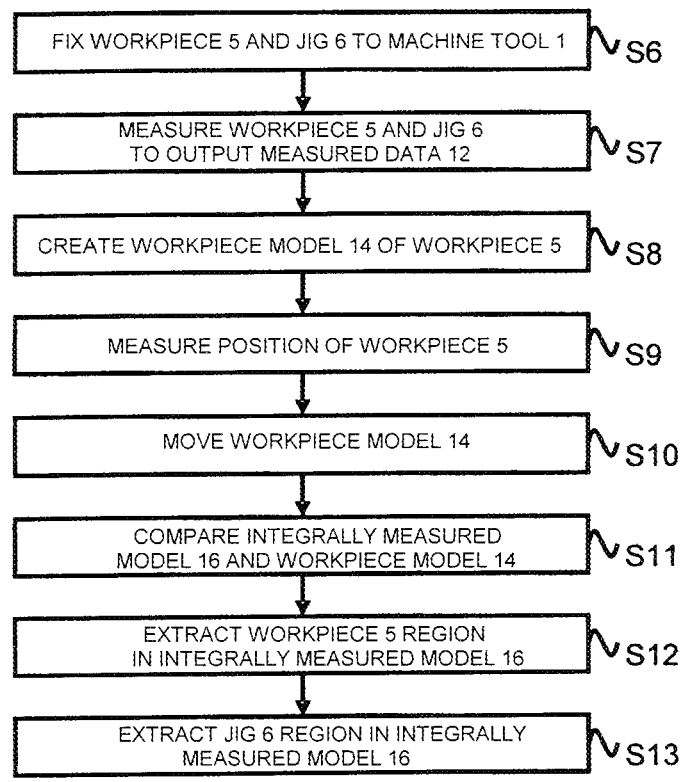
FIG. 16 shows a flowchart showing a flow to create an individually measured model.

FIG. 16 shows a flowchart indicating procedures to generate the individually measured workpiece model 18 and the individually measured jig model 19 from the measured data 12 performed by the devices shown in FIG. 2, from the three-dimensional measuring device 3 to the simulation unit 11.

In order to generate the individually measured workpiece model 18 and the individually measured jig model 19 from the measured data, firstly, the workpiece 5 and the jig 6 are fixed to the machine tool 1 (S6). The three-dimensional measuring device 3 measures height information of the surfaces of the workpiece 5 and the jig 6 fixed to the table 4 of the machine tool 1 to output the measured data 12 in which the height information is represented with point cloud data of the three-dimensional coordinates (X, Y, Z) with respect to the reference point 13 representing a certain point on the table 4 (S7).

Next, the workpiece model 14 of the workpiece 5 is created (S8). Then, the position of the workpiece 5 with respect to a certain point on the table 4 is measured (S9). It should be noted that, in order to process the workpiece 5 by the machine tool 1 using numeric control commands of an NC program or the like, the position of the tool should be commanded by measuring the position of the workpiece 5 with respect to a certain point on the table 4 of the machine tool 1 and correcting the position of the workpiece 5. The position of the workpiece 5 may be measured by a method using a contact-type measuring instrument. The position of the workpiece 5 may also be estimated by extracting interest points from the measured data by analyzing the measured data 12.

Next, the workpiece model 14 of the workpiece 5 is moved to a position corresponding to the position of the workpiece 5 fixed to the machine tool 1 by using the position of the workpiece 5 measured in S4 (S10). Then, the measured data 12 is converted to the integrally measured model 16 to compare the shape with the workpiece model 14 of the workpiece 5 (S11). Although the measured data 12 is represented with a set of coordinates of points, the measured data 12 can be converted into the integrally measured model 16 by connecting the points by lines to generate triangles.

Next, in the integrally measured model 16, the region included inside the workpiece model 14 is set as the individually measured workpiece model 18 (S12). Further, in the integrally measured model 16, the region which is not included in the workpiece model 14 is set as the individually measured jig model 19 (S13). The workpiece model 14 and the integrally measured model 16 are represented by the coordinates of the vertexes of the triangles. In comparing models represented by coordinates of the vertexes of the triangles, inclusion relationships of the models can be determined by calculating overlapping regions of the triangles.

Figure 17:
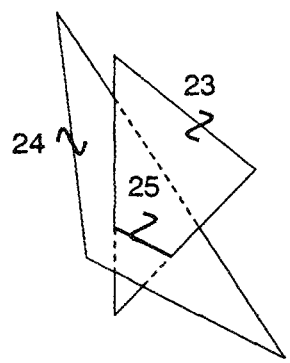
FIG. 17 shows a view in which triangles of two models are overlapped.

FIG. 17 shows a state in which a triangle 23 and a triangle 24 are overlapped. An intersection between one edge of the triangle 23 and the triangle 24 is obtained. Further, another intersection between another edge of the triangle 23 and the triangle 24 is obtained. An intersection line 25 connecting between the two intersections is obtained. As a result of repeated operations of this process, a continuous line of the intersection line 25 can be obtained. The inclusion relationship of the models can be determined with this continuous line recognized as a boundary so as to obtain the individually measured workpiece model 18 and the individually measured jig model 19 from the integrally measured model 16.

What is claimed is:

1. A numeric controller for controlling relative movement between a tool and a workpiece with a jig fixed to a machine tool, the numeric controller comprising:
   a three-dimensional model storage to store a three-dimensional model of at least one of the workpiece and the jig;
   a three-dimensional measuring unit to integrally measure shapes of the workpiece and the jig fixed to the machine tool and to generate measured data of the workpiece and the jig;
   a measured data storage to store the measured data generated by the three-dimensional measuring unit, wherein the workpiece and the jig are integrally recognized based on the measured data; and
   a shape processor to generate, based on the measured data of the workpiece and the jig stored in the measured data storage, an integrally-measured model in which the workpiece and the jig are integrally recognized, and further to generate an individually measured model of at least one of the workpiece and the jig in which the at least one of the workpiece and the jig is individually distinguished based on a comparison of the generated integrally-measured model and the three-dimensional model of the at least one of the workpiece and the jig stored in the three-dimensional model storage;
   wherein the numeric controller controls the relative movement between the tool and the workpiece with the jig by referencing the individually measured model generated by the shape processor.

2. The numeric controller according to claim 1, wherein based on the comparison of the integrally-measured model and the three-dimensional model of the at least one of the workpiece and the jig, the shape processor is to generate, in the integrally-measured model, a region not included in the three-dimensional model of the at least one of the workpiece and the jig as an individually measured model of the other of the workpiece and the jig.

3. The numeric controller according to claim 1, wherein based on the comparison of the integrally-measured model and the three-dimensional model of the at least one of the workpiece and the jig, the shape processor is to generate, in the integrally-measured model, a region included in the three-dimensional model of at least one of the workpiece and the jig as an individually measured model of the at least one of the workpiece and the jig.

* * * * *